July 15, 1958
C. R. BAYLESS
2,843,823
INTERFACE LOCATOR
Filed Dec. 9, 1955
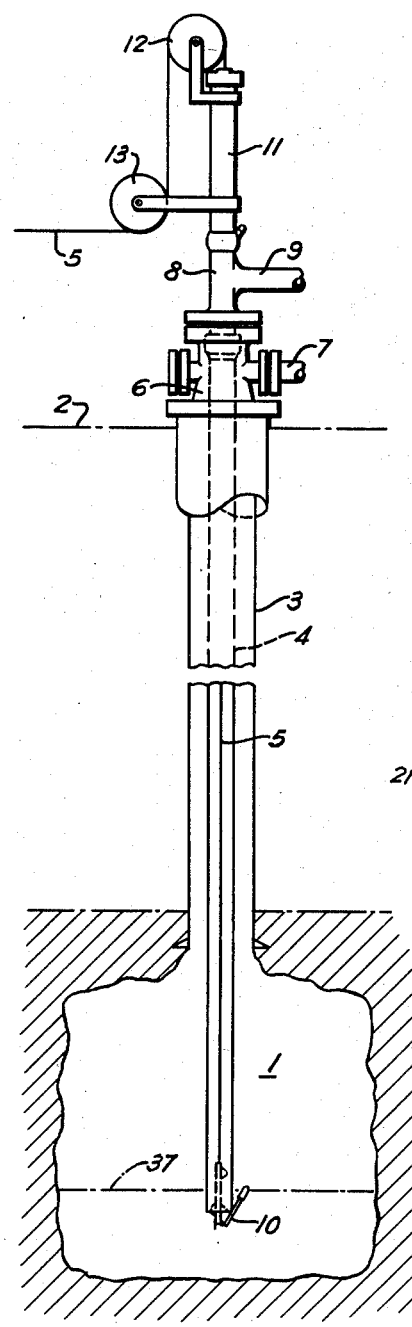
Fig. 1
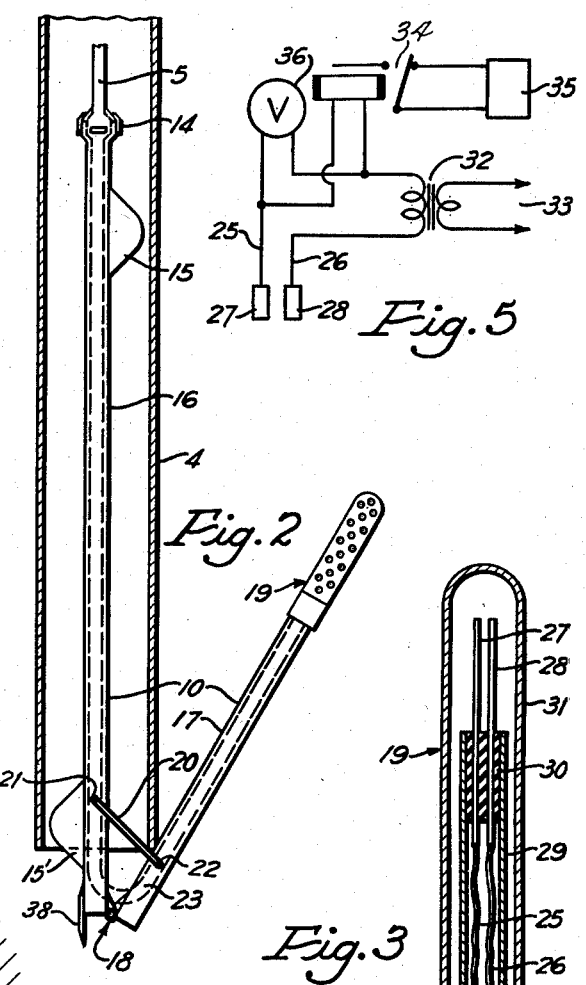
Fig. 2
Fig. 3
Fig. 5
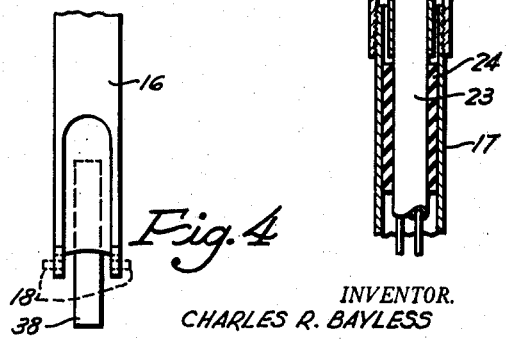
Fig. 4
INVENTOR.
CHARLES R. BAYLESS
BY
HIS ATTORNEY

United States Patent Office 2,843,823
Patented July 15, 1958

2,843,823
INTERFACE LOCATOR

Charles R. Bayless, Channelview, Tex., assignor to Gulf Oil Corporation, Pittsburgh, Pa., a corporation of Pennsylvania Application December 9, 1955, Serial No. 552,010

8 Claims. (Cl. 324—30)

This invention relates to an interface locator and more particularly to a device in the character of a probe for locating the position in an enclosed chamber of the interface between two immiscible liquids of different electrical conductivity.

Considerations of economy and security have emphasized the desirability of storing hydrocarbons and other liquids in underground cavities. In the handling and storage of volatile combustible liquids underground, considerations of safety dictate use of the technique of displacement of one liquid with another liquid with which it is not miscible. In the case of hydrocarbons it is found most convenient and safe to use brine, and for convenience in terminology the term "brine" will be used herein to include all aqueous solutions having substantial electrical conductivity. When a cavity is to be filled with hydrocarbon material the chamber is first filled with brine and this brine is then displaced by hydrocarbons pumped into the chamber, the displaced brine being forced out of the chamber through a connection leading from a low point thereof. When the hydrocarbon material is to be withdrawn from the chamber it is displaced by a stream of brine forced thereinto, the displaced lighter liquid leaving the chamber through a connection leading from a high point thereof.

It is of much importance that hydrocarbon material be kept out of the brine system, and the escape of hydrocarbon material from the underground chamber into the brine system is conveniently prevented by maintaining the interface between brine and hydrocarbon at a level somewhat above the point in the chamber at which water is withdrawn. These chambers or cavities are ordinarily well below the surface of the ground and the only means of communication with them is through conduits, such as casing and tubing, leading downward thereinto from the surface of the ground.

Hydrocarbons do not have substantial electrical conductivity and therefore detection of the location of the interface between hydrocarbon and brine is conveniently accomplished by introducing into the chamber two electrodes connected to some source of electrical energy, with a sensing device of some kind, e. g. an ammeter, in the circuit. The electrodes are introduced into the chamber on a cable or equivalent means that permits determination of the position of the electrodes in the chamber, and the device carrying the electrodes may be lowered and raised through the chamber to locate the point at which a conductive liquid is met or lost. Or such an electrode device may be positioned at a fixed point, e. g. the lowest point to which it is desired for the interface to go, and in this case the passing of the interface below the electrode is signaled by a break in the electrical circuit when the conductive brine falls below the electrodes and they become surrounded by non-conductive hydrocarbon.

The only practical channel for introduction of an electrode probe into an underground cavity is through one of the conduits used for the introduction and withdrawal of fluid, and the conduit used for brine is the logical channel for introduction of my electrode probe. This is true because the water conduit, or tubing, leads to the approximate depth at which we are concerned with the location of the interface, because the surface fittings are conventionally of a design adapted for introduction of such a device through the tubing, and because the device could not be lowered in the annulus between tubing and casing with any assurance that it would not be hung up at some point where the two conduits happen to be eccentric rather than concentric.

In order that hydrocarbon material may be prevented from invading the brine system while being pumped into the underground cavity it is necessary to detect the interface not at the very bottom of the tubing but at a point somewhat above the bottom of the tubing—enough above the bottom of the tubing that hydrocarbon will not pass into the tubing due to cavitation or other cause. To accomplish this purpose I have invented an electrode probe which, when in use, has a V shape, with one end of the V extending upward inside of the tubing and the other end extending upward outside of the tubing. The leg which extends upward outside of the tubing carries electrodes at its upper extremity. I shall describe this invention and its use in conjunction with the accompanying drawings.

Referring to the drawings,

Figure 1 is an overall view, partly in section, showing an underground cavity storage chamber, a borehole thereinto, together with casing and tubing, above-surface connections, and position of the electrode probe when in use.

Figure 2 is an overall view of the probe and of the tubing through which it is introduced, the probe being shown in open position, as used.

Figure 3 is a sectional view of the probe head, showing electrodes, connections, and manner of assembly.

Figure 4 is a detail drawing indicating the manner in which the hinge sections are cut away at the hinge joint to permit flexing of the cable.

Figure 5 indicates an electrical circuit conveniently used with this device.

Referring to Figure 1, numeral 1 indicates a subterranean cavity to be used for liquid storage. The surface of the earth is indicated at 2. A borehole from the surface of the earth into the subterranean cavity is lined with casing 3, and tubing 4 extends down inside of the casing, and beyond the casing, to a point in the cavity near the bottom thereof. Inside of tubing 4 is cable 5 which carries electrode probe 10 at its lower extremity. The above-surface equipment includes casing head 6 with light-liquid (hydrocarbon) offtake 7, and tubing head 8 with heavy-liquid (brine) connection 9. Connecting into the top of the tubing head is a short length of conduit 11 in axial alignment with tubing 4, and this tubing 11 carries sheaves 12 and 13 for use in lowering and raising cable 5 and the electrode probe 10. Numeral 37 indicates the interface between hydrocarbon and brine at the lowest level desired.

Referring to Figure 2, the electrode probe, indicated overall by numeral 10, is shown in open position at the lower extremity of tubing 4. The electrode probe is fastened to its supporting cable 5 by fastening means 14, and it is provided with fins 15 and 15' to maintain it in approximate axial alignment with tubing 4. The electrode probe comprises an upper rigid section 16, a lower rigid section 17, a hinged joint 18, an electrode head 19, a slide link 20 extending between shear pins 21 and 22, and insulated cable 23. A stop piece 38 provides support for lower section 17 when the probe is being withdrawn from the cavity through tubing 4.

Figure 3 is an enlarged view of the head 19 of the electrode probe. Numeral 17 indicates the lower hinged section of the probe. Insulated cable 23 extends through this tubular shell and is fastened and sealed therein by plug 24. Conducting wires 25 and 26 extend out of the terminal end of cable 23 and are fastened to electrodes 27 and 28. The connection between the end of cable 23 and electrodes 27 and 28 is made rigid and sealed and protected by a connecting sleeve 29. The electrodes are sealed into the remote end of this sleeve by sealing and insulating plug 30. The electrodes and their connections to insulated cable 23 are further protected by a perforated enclosing guard 31 which is rigidly fastened to shell 17.

Figure 4 shows the lower extremity of upper rigid section 16 of probe 10, the view being at an angle of 90° to the showing in Figure 2. This illustrates the manner in which the side of section 16 which carries hinge 18 is cut away to accommodate cable 23 when the probe is in its ordinary, or folded, position. For clarity of illustration, cable 23 is not shown in this view. The adjacent extremity of lower rigid section 17 is cut away in similar manner.

Referring to Figure 5 the electrodes 27 and 28 at the extremity of electrode probe 10 are shown, as well as conductors 25 and 26 which are enclosed in insulated cable 23 of Figures 2 and 3. A transformer 32, supplied with power from a source 33, supplies the necessary energy for operating the electrode probe. Whenever electrodes 27 and 28 are surrounded by a conducting liquid a closed circuit is created and the current, operating through control relay 34, energizes the sensing medium 35. Voltmeter 36 indicates the voltage in the circuit. Any electrical sensing device other than a voltmeter can be used, e. g. an ammeter or a relay, and the circuit can be set up so that a breaking of the circuit at the electrodes will automatically cause a shutting-down of the hydrocarbon charging pump.

In the operation of my invention the electrode probe 10 is inserted into the conduit 11 on the end of cable 5. Cable 5 may advantageously be not only a supporting cable but also a current conducting cable, and be a direct electrical continuation of insulated cable 23 of the probe. In introducing my probe into the tubing the lower end 17 of the probe is first folded back upon the upper section 16 thereof, with lower section 17 lying close against upper section 16. In this position the probe is lowered to the lower terminus of tubing 4. As has been mentioned in the description of Figure 2, sections 16 and 17 of the hinged probe are connected by a sliding link 20 which extends between shear pins 21 and 22. These two shear pins are advantageously positioned at slightly different distances from hinge 18 so that link 20 will not lie directly crosswise of the tubing when the electrode probe is being lowered therethrough, and the link 20 is of such a length that it will permit lower section 17 of the electrode probe, when that section has been fully lowered beyond the lower extremity of tubing 4 to fall outward from upper section 16 of the probe at an angle thereto which is substantially less than 90°. An angle of from 30° to 45° is ordinarily advantageous.

Stated in other words, the lower end 17 of the electrode probe 10 is folded back on its upper section 16, about hinge 18, at an angle of 180° while the device is being lowered through tubing 4 and when the extremity 19 of lower section 17 passes below the lower extremity of tubing 4, lower section 17 of the probe 10 falls outward from upper section 16 at an angle thereto which is substantially less than 90°, advantageously 30° to 45°. In this latter position lower end 17 is folded back on upper section 16 at an angle substantially in excess of 90°, advantageously 135° to 150°. When the electrode probe is in operating position, as shown in Figure 2, the angle at which the lower section hangs out from the upper section, and the angle at which the lower section is folded back toward the upper section, are complementary angles totaling 180°. The angle between upper section 16 and lower section 17 when the instrument is in use is determined by the length of link 20. In operation it is essential that the angle between sections 16 and 17 of the probe, measured about hinge 18, be an acute angle, in order that electrodes 27 and 28 may be held at a point substantially above the lower end of tubing 4.

Once the probe has been lowered to a point where the extreme end of perforated guard 31 is below the lower end of tubing 4, section 17 will fall outward from section 16 due to its own weight, and the extent of its outward movement will be limited by link 20. When lower section 17 has fallen away from upper section 16, cable 5 is carefully raised until section 17 and link 20 bear against the lower end of the tubing. By placing a fin 15' at a low point on section 16, faced away from hinged section 17, and another fin 15 at a high point on section 16 and on the same side thereof as hinge 18, I find it possible to keep upper section 16 in approximate axial alignment with the tubing.

In order to permit removal of the electrode probe from the subterranean cavity I find it advantageous to build the device with link 20 or shear pins 21 and 22, or all three of these elements, of adequate strength to hold lower section 17 of the probe in the desired position for use, while yet of such a strength that one or another of elements 20, 21 or 22 would be broken by the exertion of a strong upward force on cable 5 without damage to other portions of the instrument.

In the construction and use of this electrode probe I have had very satisfactory results when constructing the lower rigid section 17 of a length to bring the electrodes 27 and 28 to a position two feet higher in elevation than the bottom of tubing 4. Silvered copper electrodes with an area of one square inch have been quite satisfactory. The magnitude of the current will of course depend on the conductivity of the brine but a current of fifty milliamperes is fully adequate with appropriate sensing means.

The electrode probe is an advantageous device not only in the case of liquid hydrocarbons, but it is likewise useful in the underground storage of gaseous material when the technique of liquid displacement is used in the charging and withdrawal of material from an underground or other closed chamber.

While my invention has been described in relation to the storage of hydrocarbon material, that has been for convenience and clarity of presentation, but my electrode probe is equally adaptable to and equally useful in determining the location of the interface between any two immiscible fluids of different density at least one of which has measurable electrical conductivity and between which there is a measurable difference in electrical conductivity.

The electrode probe has been described so far as having two electrodes 27 and 28, and two condctors 25 and 26. Of course the device could be constructed with a single electrode and a single conductor, in which case the tubing 4 would serve as the other electrode and also as conductor.

I claim:

1. A device in the character of a probe for detecting the position in an enclosed chamber of the interface between two immiscible liquids of different electrical conductivity which comprises an articulate slender frame carrying electrodes at one end thereof and means of attachment to a supporting cable at the opposite end thereof, having a flexible joint intermediate the two ends thereof and having the electrode-carrying end normally bent back at said flexible joint toward the opposite end at an angle substantially in excess of 90° and provided with a frangible means connected to the probe on opposite sides of the flexible joint to maintain the device in the bent position; and electrical conductors leading from the said electrodes to the opposite end of said device and therebeyond to an electrical sensing device.

2. A device in the character of a probe for detecting the position in an enclosed chamber of the interface between two immiscible liquids of different electrical conductivity which comprises an articulate slender frame carrying electrodes at one end thereof and means of attachment to a supporting cable at the opposite end thereof, having a flexible joint intermediate the two ends thereof and having the electrode-carrying end normally bent back at said flexible joint toward the opposite end at an angle approximately between 135° and 150° and provided with a frangible means connected to the probe on opposite sides of the flexible joint to maintain the device in the bent position; and electrical conductors leading from the said electrodes to the opposite end of said device and therebeyond to an electrical sensing device.

3. A device in the character of a probe for detecting the position in an enclosed chamber of the interface between two immiscible liquids of different electrical conductivity which comprises an articulate slender frame carrying electrodes at one end thereof and depending from a supporting cable at the opposite end thereof, having a flexible joint intermediate the two ends thereof and having the electrode-carrying end normally bent back at said flexible joint toward the opposite end at an angle substantially in excess of 90° and provided with a frangible means connected to the probe on opposite sides of the flexible joint to maintain the device in the bent position; and electrical conductors leading from the said electrodes to the opposite end of said device and therebeyond to an electrical sensing device.

4. A device in the character of a probe for detecting the position in an enclosed chamber of the interface between two immiscible liquids of different electrical conductivity which comprises an articulate slender frame carrying electrodes at one end thereof and means of attachment to a supporting cable at the opposite end thereof, having a flexible joint intermediate the two ends thereof and having the electrode-carrying end normally bent back at said flexible joint toward the opposite end at an angle substantially in excess of 90° and provided with a frangible means connected to the probe on opposite sides of the flexible joint to maintain the device in the bent position; and electrical conductors leading from the said electrodes to the opposite end of said device and therebeyond to an electrical sensing device, the said electrical conductors constituting the said supporting cable.

5. A device in the character of a probe for detecting the position in an enclosed chamber of the interface bebetween two immiscible liquids of different electrical conductivity which comprises an articulate slender frame with a rigid upper section and a rigid lower section, these two sections being fastened together by means of a flexible joint, electrodes carried at one end of said slender frame and a means for attachment to a supporting cable at the opposite end thereof, the electrode-carrying end being normally bent back at said flexible joint toward the opposite end at an angle substantially greater than 90°; a frangible element connected to the probe on opposite sides of the flexible joint to maintain the device in the bent position; electrical conductors leading from the electrodes to the opposite end of said device and therebeyond to an electrical sensing device.

6. An apparatus for detecting the position of the interface between two immiscible liquids of different electrical conductivity contained in a chamber which comprises: a conduit extending downward into said chamber to a point slightly below the lowest point at which it is desired to maintain the said interface, and a probe adapted to be folded back upon itself and in such position to be introduced into the said chamber through the said conduit; the said probe being in the form of a slender frame carrying electrodes at one extremity thereof and having means for attachment to a supporting element at the opposite extremity thereof and having a hinged joint intermediate its two extremities; a frangible means connected to the probe at two points, these points being on opposite sides of the hinge and relatively near thereto, the said frangible means holding the probe in bent position and limiting the movement of the two ends thereof within an angle substantially less than 90° with respect to each other; a supporting element extending downward within the conduit, attached to the probe at the extremity thereof opposite to the extremity carrying the electrodes and maintaining the probe at a normal operating position with the frangible element in close proximity to the lower end of the conduit and with the electrodes extending upward therefrom to a point above the lower end of the conduit; and electrical conductors leading upward through the conduit from the said electrodes to an electrical sensing device outside of the said chamber.

7. An apparatus for detecting the position of the interface between two immiscible liquids of different electrical conductivity contained in a chamber which comprises: a conduit extending downward into said chamber to a point slightly below the lowest point at which it is desired to maintain the said interface, and a probe adapted to be folded back upon itself and in such position to be introduced into the said chamber through the said conduit; the said probe being in the form of a slender frame carrying electrodes at one extremity thereof and having means for attachment to a supporting element at the opposite extremity thereof and having a hinged joint intermediate its two extremities; a frangible means connected to the probe at two points, these points being on opposite sides of the hinge and relatively near thereto, the said frangible means holding the probe in bent position and limiting the movement of the two ends thereof within an angle substantially less than 90° with respect to each other; a supporting element extending downward within the conduit, attached to the probe at the extremity thereof opposite to the extremity carrying the electrodes and maintaining the probe at a normal operating position with the frangible element in close proximity to the lower end of the conduit and with the electrodes extending upward therefrom to a point above the lower end of the conduit; and electrical conductors leading upward through the conduit from the said electrodes to an electrical sensing device outside of the said chamber, the said electrical conductors constituting the supporting element.

8. An apparatus for detecting the position of the interface between two immiscible liquids of different electrical conductivity contained in a chamber which comprises: a conduit extending downward into said chamber to a point slightly below that at which it is desired to maintain the said interface, and a probe adapted to be folded back upon itself and in such position to be introduced into the said chamber through the said conduit; the said probe being in the form of a slender frame carrying electrodes at one extremity thereof and having means for attachment to a vertically movable supporting element at the opposite extremity thereof and having a hinged joint intermediate its two extremities; a frangible means connected to the probe at two points, these points being on opposite sides of the hinge and relatively near thereto, the said frangible means holding the probe in bent position and limiting the movement of the two ends thereof within an angle substantially less than 90° with respect to each other; a vertically movable supporting element extending downward within the conduit, attached to the probe at the extremity thereof opposite to the extremity carrying the elecrodes, and adapted to lower the electrode-carrying end of the probe to a point below the lower end of the conduit and so cause it to fall outward from the opposite end of the probe and then raise the probe to a normal operating position with the frangible element in close proximity to the lower end of the conduit and with the electrodes extending upward therefrom to a point above the lower end of the conduit; and electrical conductors leading upward through the conduit from the said electrodes to an electrical sensing device outside of the said chamber.

References Cited in the file of this patent

UNITED STATES PATENTS

| | | |
|---|---|---|
| 1,518,211 | Maue | Dec. 9, 1924 |
| 2,688,116 | Stahl et al. | Aug. 31, 1954 |